United States Patent [19]
Jiang

[11] Patent Number: 5,689,410
[45] Date of Patent: Nov. 18, 1997

[54] SPLIT-BOOST CIRCUIT HAVING IMBALANCE PROTECTION CIRCUITRY

[75] Inventor: Yimin Jiang, Plano, Tex.

[73] Assignee: Lucent Technologies Inc., Murray Hill, N.J.

[21] Appl. No.: 668,173

[22] Filed: Jun. 21, 1996

[51] Int. Cl.$^6$ ................................................. H05B 37/02
[52] U.S. Cl. ................................................................. 363/56
[58] Field of Search ................................ 361/85, 113, 87; 363/37, 14, 70–72, 132, 56–57; 307/64–66

[56] References Cited

U.S. PATENT DOCUMENTS

| | | | |
|---|---|---|---|
| 5,072,355 | 12/1991 | Huillet | 363/89 |
| 5,097,183 | 3/1992 | Vila-Masot et al. | 315/226 |
| 5,122,724 | 6/1992 | Criss | 323/222 |
| 5,126,585 | 6/1992 | Boys | 307/66 |
| 5,155,430 | 10/1992 | Gulczynski | 323/222 |
| 5,313,143 | 5/1994 | Vila-Masot et al. | 315/209 R |
| 5,319,533 | 6/1994 | Reynolds | 363/17 |
| 5,343,383 | 8/1994 | Shinada | 363/127 |
| 5,345,376 | 9/1994 | Nourbakhsh | 363/62 |

OTHER PUBLICATIONS

Farrington, R.W. et al., "A Boost Topology With Two Outputs For Power Factor Correction Application," Patent Application Ser. No. 08/344309, Filed Nov. 22, 1994.

Farrington, R.W. et al., "A High Efficiency Boost Topology With Two Outputs," Patent Application Ser. No. 08/756738, Filed Nov. 26, 1996.

Jiang, Y. et al., "Three–Level Boost Converter for and Its Application in Single–Phase Power Factor Correction," *1994 VPEC Seminar Proceedings*, at Virginia Tech, Sep. 11, 1994, pp. 127–133.

*Primary Examiner*—Aditya Krishnan
*Attorney, Agent, or Firm*—Robert R. Axenfeld

[57] ABSTRACT

A rectifier architecture with a split boost circuit having protection circuitry for protecting circuit elements of the split boost. The split boost includes a voltage input terminal, an inductor, two voltage output terminals, a boost diode and branches A and B. Each branch A and B, includes: a switch, a protection circuit, and a capacitor. In a preferred embodiment, the protection circuit is a parallel resistor-diode pair coupled between the capacitor and the switch. The purpose of the protection circuit is to limit circulating current between capacitors when switches in branches A and B are active.

11 Claims, 2 Drawing Sheets

SPLIT-BOOST CIRCUIT HAVING IMBALANCE PROTECTION CIRCUITRY

CROSS REFERENCE TO RELATED PATENT APPLICATION

The present application relates to U.S. patent application Ser. Nos. 08/344,309 and 08/769,285 both entitled, "A High Efficiency Topology with Two Outputs, filed Nov. 22, 1994 and Dec. 18, 1996, respectively, commonly owned by Lucent Technologies, Murry Hill, N.J., U.S.A., and both incorporated herein by reference.

FIELD OF THE INVENTION

The present invention relates generally to switching power supplies, and more specifically to a circuit designed to protect active elements of a split boost circuit power supply.

BACKGROUND OF THE INVENTION

Farrington describes an improved high-efficiency rectifier, typically used in telecommunication applications. Farrington employs a split boost circuit to provide two equal but unparalleled output voltages across two capacitors. As described in detail in Farrington, the split boost circuit employs two switches to control charging of the two capacitors. When the switches are simultaneously inactive, the two capacitors are connected in series, and when the switches are active, the capacitors are connected in parallel.

Under ideal operation, the duty cycle of the switches is constant. Voltage levels across the two capacitors are maintained at a constant and equal level, independent of DC load currents. By maintaining nearly constant and equal voltages across the two capacitors, any circulating current, which flows from one capacitor to the other when the two switches are periodically closed, is not large enough to materially affect circuit performance.

On the other hand, excessive current flow may occur when the switches are closed after a delay in the switching cycle. Delays in closing the switches are caused when a controller (the controller regulates the switching cycle) detects excessive dynamic fluctuations in current or voltage from either the input or output stages of the rectifier (e.g., bus voltage of the rectifier exceeds set limit). To compensate for such dynamic fluctuations, the controller typically halts switching to correct for the fluctuation, but inadvertently causes voltages of the split boost circuit capacitors to become unequal when under different loads. When the voltage difference between the capacitors becomes large enough, excessive circulating current flows from one capacitor to the other, which overheats and likely destroys the switches (when the switches go active/closed). Destruction of the switches can occur gradually over time or instantaneously, depending on the magnitude of the excessive current flow.

What is needed, therefore, is a mechanism to prevent the switches from being damaged after they go active following a delay in the switching cycle and excessive current circulates between the two capacitors.

SUMMARY OF THE INVENTION

The present invention is directed to a rectifier architecture with a split boost circuit having protection circuitry for protecting circuit elements of the split boost. The split boost includes a voltage input terminal, an inductor, two voltage output terminals, a boost diode and branches A and B. Each branch A and B, includes: a switch, a protection circuit, and a capacitor. In a preferred embodiment, the protection circuit is a resistor-diode coupled between the capacitor and the switch. The purpose of the protection circuit is to limit circulating current between capacitors when switches in branches A and B are active.

When the switches in both branches are simultaneously active the branches are connected together in parallel. Any excessive current circulating in the branches is limited in either direction by one of the protection circuits. In a preferred embodiment, the protection circuit is a resistor and diode pair connected in parallel.

A significant advantage of the present invention is the ability to compensate large voltage imbalances between capacitors in the split boost.

Another feature of the present invention is that the amount of power drop attributed to the protection circuitry is nominally small during normal operation.

A further advantage of the present invention (given a maximum allowed circulating current determined by the current capability of the switches), is an ability to select a maximum allowed imbalance output voltage across the capacitors by choosing appropriate values for the resistors of each resistor-diode pair.

Other features and advantages of the present invention may become apparent after reading the foregoing description.

DETAILED DESCRIPTION OF THE INVENTION

The operation and topology of a split boost circuit is described in detail in U.S. patent application Ser. No.: 08/344,309, entitled A High Efficiency Boost Topology with Two Outputs, filed Nov. 22, 1994, to Farrington et al., incorporated herein by reference.

Figure 1:
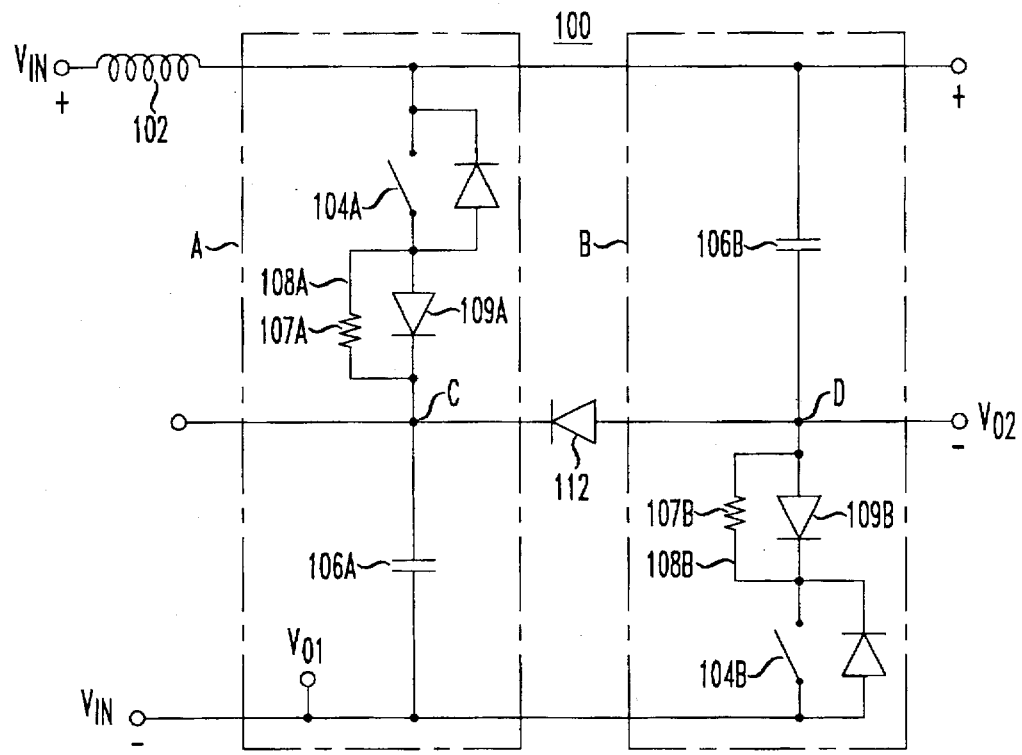
FIG. 1 is a circuit diagram of a split boost circuit 100, according to a preferred embodiment of the present invention.

The present invention is directed to a circuit for protecting electronic devices of a split boost circuit. FIG. 1 is a circuit diagram of a split boost circuit 100, according to a preferred embodiment of the present invention. The split boost circuit 100 includes: a voltage input terminal Vin, an inductor 102, two voltage output terminals $V_{o1}$, $V_{o2}$, a boost diode 112 and electrical branches A and B. Each branch A and B, includes: a switch 104, protection circuitry 108, and a capacitor 106. Protection circuitry 108 includes a resistor 107 and diode 109 coupled in parallel, hence "resistor-diode pair" 107, 109.

Figure 2:
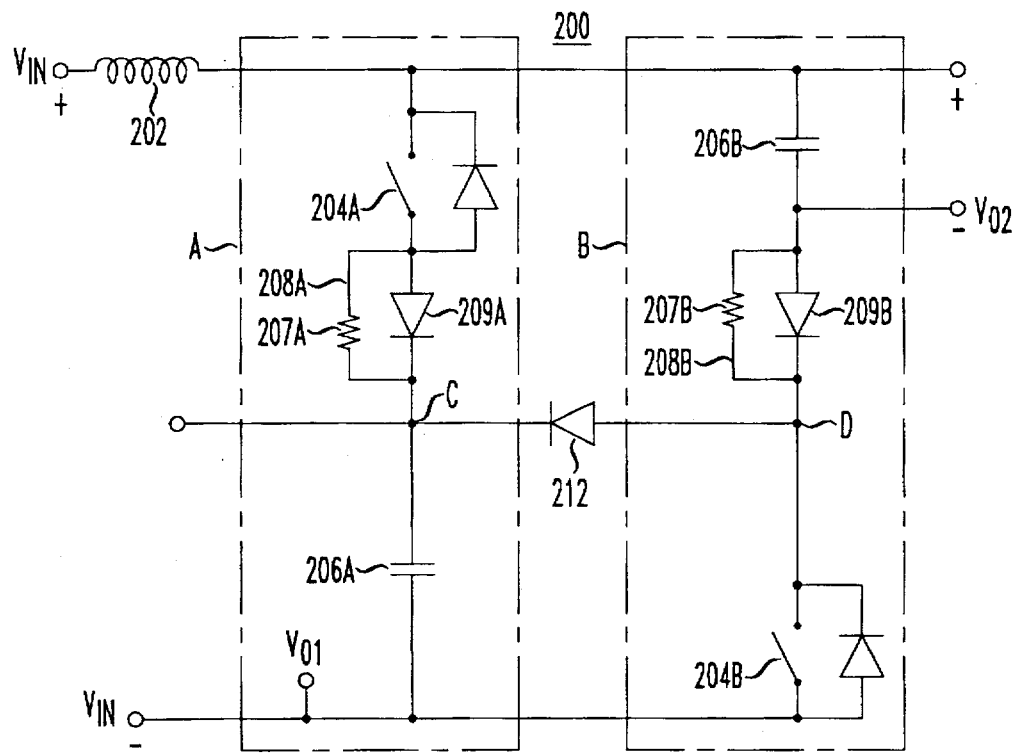
FIG. 2 is alternative embodiment of a split boost circuit 200, according to the present invention.

FIG. 2 is alternative embodiment of a split boost circuit 200, according to the present invention. FIG. 2 is identical to FIG. 1, except the resistor-diode pairs 207 are connected directly to the capacitors 206 with node points C and D connecting the boost diode 212 and branches A and B together as opposed to node points C and D between resistor-diode pairs 107, 109 and the capacitors 106, as shown in FIG. 1.

Referring to FIGS. 1 and 2, in a preferred embodiment, the split boost circuits 100, 200 are deployed in a 10kW rectifier for telecommunications applications. The split boosts 100, 200 are configured to operate at approximately 400V DC voltage applications. The capacitors 106, 206 are approximately 2 mF and the resistors 107, 207 are approximately 2Ω. Diodes 109, 209 are 100V rated Schottky diodes, but any type of diode with preferably small voltage drops can be selected. Standard diodes may be used for the boost diode 112, 212. It is also appreciated that the split boost circuit 100, 200 can employ a multitude of varying valued elements depending on I/O voltage levels as well as desired conversion efficiency and power factor.

When switches 104, 204 are inactive, boost diodes 112, 212 (shown in FIGS. 1 and 2) connect capacitor 106B, 206B in series with capacitor 106A, 206A. As can be seen, the split boost circuit 200 of FIG. 2 provides the same functionality as split boost 100, but may exhibit a higher RMS current through the protection circuitry 208 as current must flow through protection circuitry 208, whereas little-to-no current flows through protection circuitry 108 when switches 104 are inactive.

Figure 3:
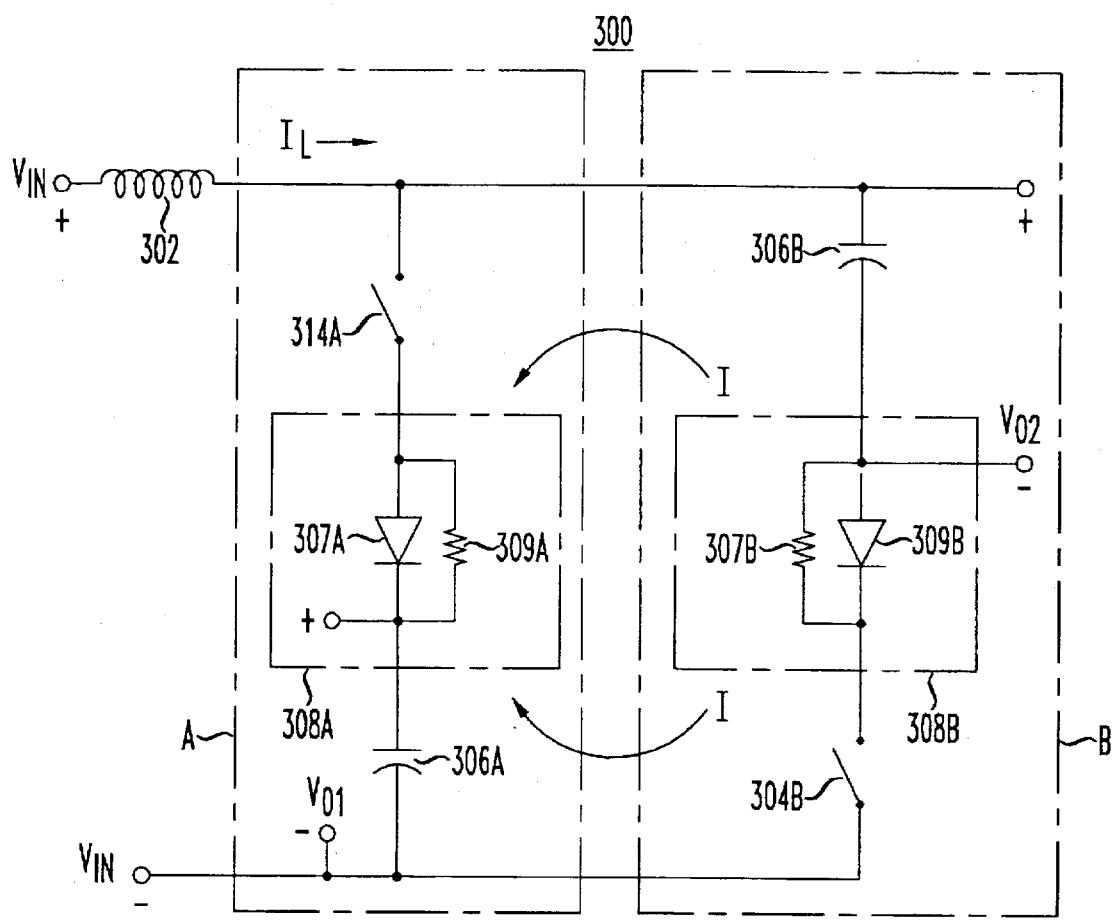
FIG. 3 is a representative equivalent circuit diagram of a split boost circuit when the switches are active, according to the present invention.

The operation of the present invention shown in FIGS. 1 and 2 can be described with reference to FIG. 3, which is a representative equivalent circuit diagram of a split boost circuit when the switches 304 are active (e.g., closed). Referring to FIG. 3, when switches 304 are 10 active, branches A and B are connected together in parallel. Boost diode 112, 212 (shown in FIGS. 1 and 2) drop out of the circuit 300.

For purposes of this discussion, it is assumed that the voltage of capacitor 306B has become greater than that of capacitor 306A due to dynamic switching delays discussed above. In this situation, current I will flow from capacitor 306B to capacitor 306A. Current I, will flow and pass through switch 304A, diode 309A, and capacitor 306A. Current I then flows through switch 304B and is forced through resistor 307B. Any excess current I is thereby limited by resistor 307B, in this example. Thus, any excess current, depending on the direction of current I is balanced by one of the resistors 307A or 307B. The value of the impedance and blocking devices (e.g., diodes) can be optimally selected for specific applications depending on expected input and output voltage level variations.

It is contemplated that the present invention could be used for other power converters.

While preferred embodiments have been set forth, various modifications, alterations, and changes may be made without departing from the spirit and scope of the present invention as defined in the specification and in the appended claims.

What is claimed is:

1. A split-boost circuit having imbalance protection circuitry, comprising:
   first and second input terminals to receive a voltage source;
   first and second electrical branches coupled together in parallel between said first and second input terminals;
   said first and second electrical branches each comprising:
   (a) a switch,
   (b) a capacitor, and
   (c) a resistor-diode pair coupled in parallel and inserted between said switch and capacitor to form a series connection;
   wherein after said switches are closed, any circulating current flowing in said first and second branches is limited by at least one resistor-diode pair in at least one of said electrical branches.

2. The split boost circuit of claim 1, further comprising an inductor coupled in a series connection between said first input terminal and said first and second electrical branches.

3. The split boost circuit of claim 1, further comprising at least one diode coupled between said first branch and said second branch such that when said switches in said branches are simultaneously open, said capacitor in said first branch is coupled in series to said capacitor in said second branch via said diode.

4. In a rectifier power system, imbalance protection circuitry for a split boost circuit, comprising:
   a voltage source having first and second input terminals;
   first and second electrical branches coupled together in parallel between said first and second input terminals;
   said first and second electrical branches each comprising:
   (a) a switch,
   (b) a capacitor, and
   (c) circuit protection means, inserted between said switch and capacitor, for blocking and limiting current passing through one of said first and second electrical branches; and
   an inductor, coupled between said first input terminal and said first and second electrical branches, to create an induction current from said voltage source to said first and second electrical branches.

5. The imbalance protection circuitry of claim 4, wherein said circuit protection means is a resistor-diode pair connected in parallel.

6. The imbalance protection circuitry of claim 4, further comprising at least one diode coupled between said first branch and said second branch such that when said switches in said branches are simultaneously open, said capacitor in said first branch is coupled in series to said capacitor in said second branch via said diode connected in-between said capacitors.

7. A power converter, comprising:
   an inductor coupled to a DC input of said power converter;
   first and second output capacitors coupled to first and second outputs of said power converter; respectively;
   first and second power switches, connected to said inductor and said first and second output capacitors, for alternatively series-coupling and parallel-coupling said first and second output capacitors;
   a connection circuit coupling a first node between said first capacitor and said first power switch to a second node between said second capacitor and said second power switch, said connection circuit alternatively:
      closing to create a direct connection between said first and second nodes when said first and second power switches are in a non-conducting state, and
      opening to interrupt said direct connection when said first and second power switches are in a connecting state; and
   first and second diode and resistor pair coupled in series with said first and second power switches, respectively, to prevent unbalanced circulating current when said power switches are conducting.

8. The power converter of claim 7, wherein said connection circuit is a switch.

9. The power converter of claim 7, wherein said connection circuit is a diode.

10. The power converter of claim 7, wherein said first and second power switches are field effect transistors.

11. The power converter of claim 7, wherein said first and second diode and resistor pair compensate for circulating current when said power switches are simultaneously conducting.

* * * * *